US012128820B1

(12) United States Patent
 Mora Ortiz et al.

(10) Patent No.: US 12,128,820 B1
(45) Date of Patent: Oct. 29, 2024

(54) VEHICLE INTERIOR LIGHTING SYSTEM

(71) Applicant: Ford Global Technologies, LLC, Dearborn, MI (US)

(72) Inventors: Laudy Patricia Mora Ortiz, Mexico City (MX); Brenda Guadalupe Tenorio Hernandez, Mexico City (MX); Carlos Ernesto Saenz Camacho, Calimaya (MX); Hector Amador, Azcapotzalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/609,718

(22) Filed: Mar. 19, 2024

(51) Int. Cl.
 *B60Q 3/54* (2017.01)
 *B60Q 3/85* (2017.01)

(52) U.S. Cl.
 CPC .............. *B60Q 3/54* (2017.02); *B60Q 3/85* (2017.02); *B60Q 2500/30* (2022.05)

(58) Field of Classification Search
 CPC ......... B60Q 3/54; B60Q 3/85; B60Q 2500/30
 See application file for complete search history.

(56) References Cited

U.S. PATENT DOCUMENTS

| | | | |
|---|---|---|---|
| 10,046,637 B2 | 8/2018 | Buttolo et al. | |
| 11,332,012 B2 | 5/2022 | Betz et al. | |
| 11,813,980 B2 | 11/2023 | Behrens et al. | |
| 2010/0214795 A1* | 8/2010 | Salter ................ | B60Q 3/233 362/488 |
| 2014/0265934 A1* | 9/2014 | Ramey ............... | B60Q 3/745 315/307 |
| 2022/0402430 A1* | 12/2022 | Knipp .................. | B60Q 3/82 |
| 2023/0373383 A1* | 11/2023 | Schmidt ............... | B60Q 1/509 |
| 2024/0093845 A1* | 3/2024 | Mazuir ................ | F21S 43/14 |
| 2024/0131985 A1* | 4/2024 | Conrad ............... | B60Q 3/80 |
| 2024/0166127 A1* | 5/2024 | Wang .................. | G06F 3/167 |

* cited by examiner

*Primary Examiner* — Christopher E Dunay
(74) *Attorney, Agent, or Firm* — Vichit Chea; Price Heneveld LLP (57) ABSTRACT

A vehicle comprising a body defining a passenger compartment. The body has a roof and a plurality of support pillars extending proximate to the roof and a plurality of lighting zones comprising a plurality of lighting devices located in an upper portion of the body proximate to the roof and the plurality of support pillars. A user input is configured to allow for the selection of the lighting zones, a color of light output and an intensity of the light output, and a controller responsive to the user input to control the lighting zones to illuminate light in a selected lighting zone at the selected intensity and color with the selected intensity and color.

14 Claims, 10 Drawing Sheets

VEHICLE INTERIOR LIGHTING SYSTEM

FIELD OF THE DISCLOSURE

The present disclosure generally relates to vehicle lighting, and more particularly relates to vehicle interior ambient lighting and a method of controlling the vehicle interior ambient lighting.

BACKGROUND OF THE DISCLOSURE

Motor vehicles are commonly equipped with various lighting systems. The passenger compartment of the vehicle typically has cabin interior lighting systems that include dome and reading lamps and ambient lighting. It would be desirable to provide for a vehicle lighting system for providing passenger compartment lighting that may be easily controlled for ambient lighting purposes.

SUMMARY OF THE DISCLOSURE

According to a first aspect of the present disclosure, a vehicle comprising a body defining a passenger compartment, the body comprising a roof and a plurality of support pillars extending proximate to the roof, a plurality of lighting zones comprising a plurality of lighting devices located in an upper portion of the body proximate to the roof and the plurality of support pillars, a user input configured to allow for the selection of the lighting zones, a color of light output and an intensity of the light output, and a controller responsive to the user input to control the lighting zones to illuminate light in a selected lighting zone at the selected intensity and color with the selected intensity and color.

Embodiments of the first aspect of the present disclosure can include any one or a combination of the following features:
 the plurality of lighting devices extend along portions of the roof and the plurality of support pillars;
 the plurality of lighting devices are segmented to allow for independent control in different lighting zones of the vehicle;
 the controller selects one of a plurality of predefined modes of lighting zones;
 the vehicle further comprises a plurality of seats, wherein each of the plurality of seats are associated with one of a plurality of the lighting zones;
 a first lighting zone is associated with a first seat, and a second lighting zone is associated with a second seat;
 the first seat comprises a driver seat and the second seat comprises a passenger seat;
 the first lighting zone includes a first lighting device extending along a front support pillar, a second lighting device extending under the roof in front of the first seat, and a third lighting device extending under the roof on the lateral side of the first seat;
 the user input comprises at least one of a portable electronic device and a vehicle touch screen display; and
 the lighting zones are located in upper regions of the passenger compartment.

According to a second aspect of the present disclosure, a method of controlling interior lighting in a vehicle is provided. The method comprises the steps of selecting one of a plurality of lighting zones configured in the passenger compartment of a vehicle with a user input, controlling a color of the selected one lighting zone with the user input, and controlling an intensity of the selected one lighting zone with the user input, wherein the selected one lighting zone comprises one or more lighting devices located proximate to a roof and upper support pillars in the vehicle.

Embodiments of the second aspect of the present disclosure can include any one or a combination of the following methods:
 the one or more lighting devices extend along portions of the roof and upper support pillars;
 the plurality of lighting zones are segmented to allow for independent control in different lighting zones of the vehicle, further comprising selecting one of a plurality of predefined modes of lighting zones;
 the vehicle comprises a plurality of seats, wherein each of the plurality of seats are associated with one of a plurality of the lighting zones;
 a first lighting zone is associated with a first seat, and a second lighting zone is associated with a second seat;
 the first seat comprises a driver seat and the second seat comprises a passenger seat;
 the first lighting zone includes a first lighting device extending along a front support pillar, a second lighting device extending under the roof in front of the first seat, and a third lighting device extending under the roof on the lateral side of the first seat;
 each lighting zone comprises one or more light pipes; and
 the plurality of lighting zones are located in upper regions of the passenger compartment.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
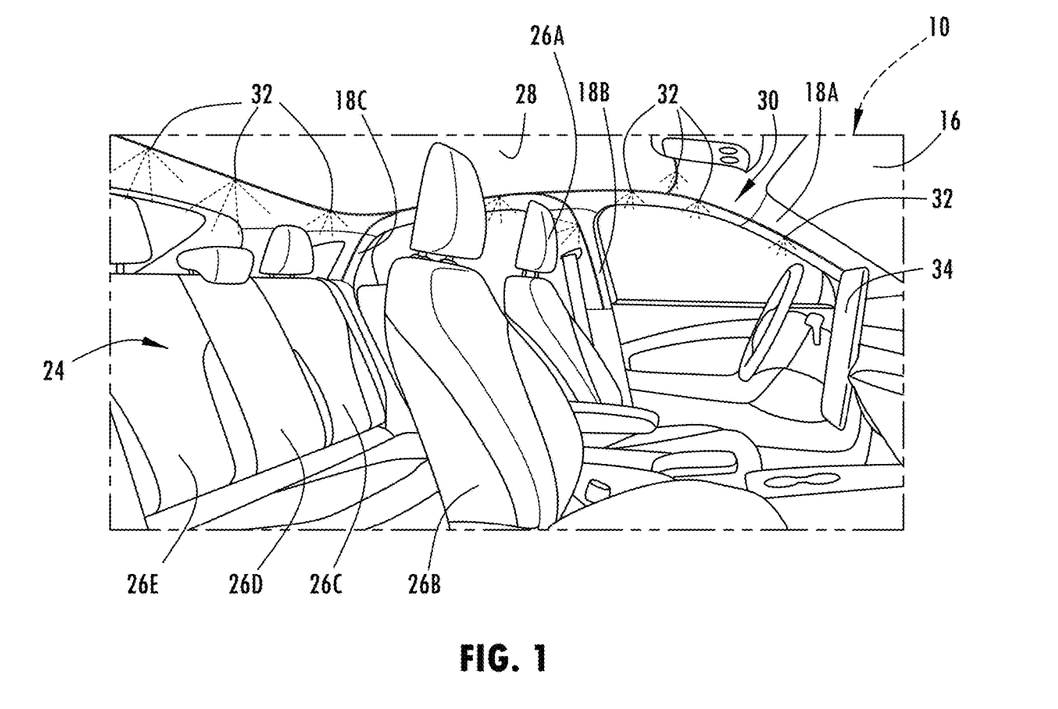
FIG. 1 is a side perspective view of the passenger compartment of a motor vehicle having an interior lighting system, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a user remotely controllable interior lighting system and method. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
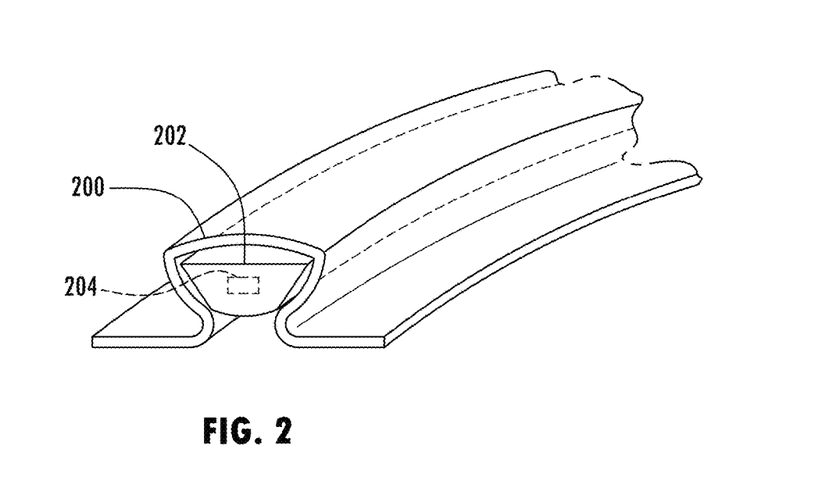
FIG. 2 is an end perspective view of one example of a light pipe lighting device used in the interior lighting system.
Figure 3:
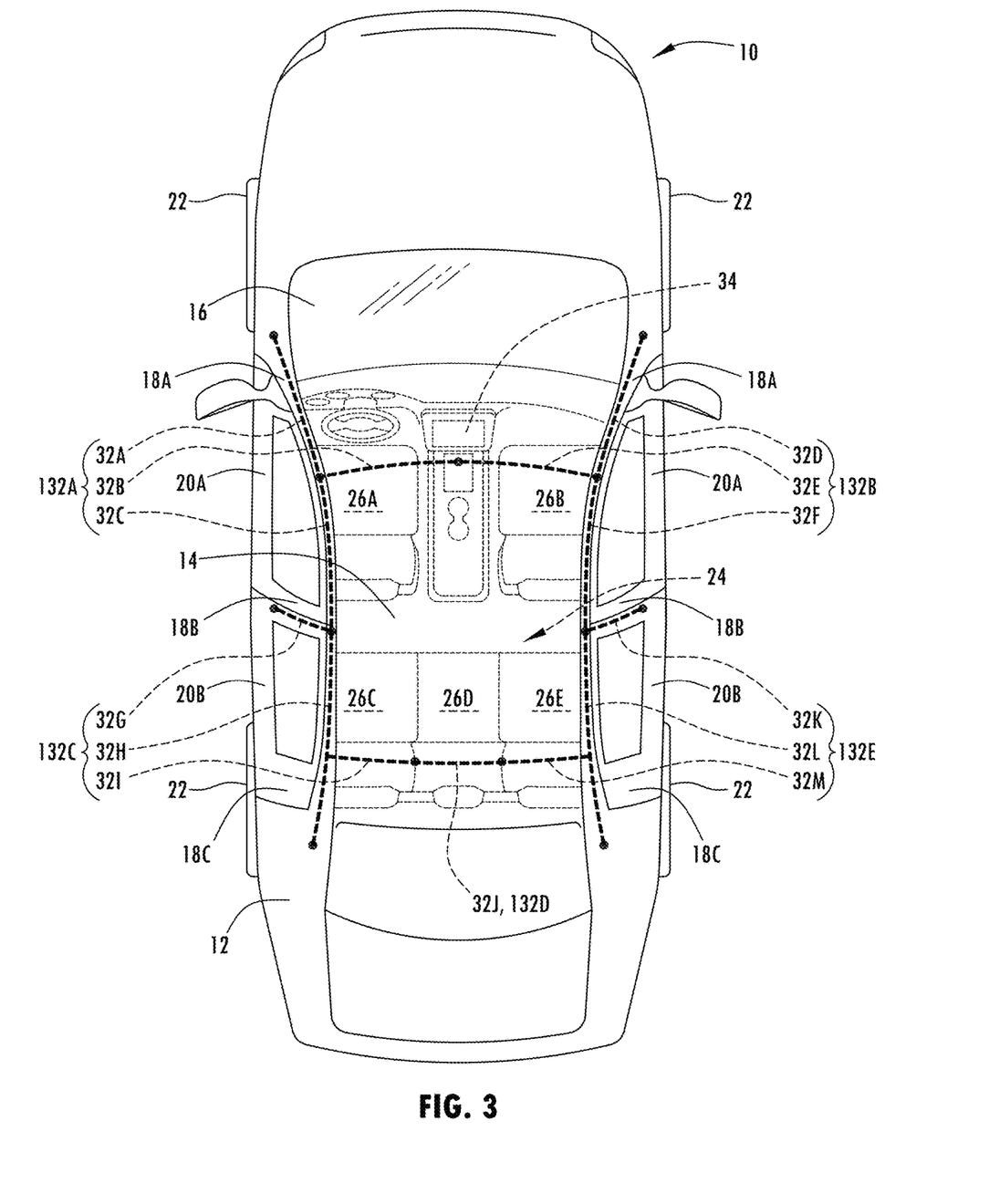
FIG. 3 is a top schematic view of the motor vehicle, further illustrating user controllable lighting zones of the interior lighting system.

Referring to FIGS. 1-3, a motor vehicle 10, such as a wheeled motor vehicle, is illustrated having a vehicle body 12 generally defining a cabin interior which is also referred to as a passenger compartment 24. The passenger compartment 24 typically is equipped with passenger seating, including front and rear rows of seating and more rows of seating for extended size vehicles. The front row seating typically includes the driver first seat 26A and a passenger second seat 26B on opposite lateral sides and generally separated by a center console. The rear rows of seating is shown in one example including a left side third seat 26C, a middle fourth seat 26D and a right side fifth seat 26E.

The motor vehicle 10 is configured with the body 12 having a plurality of side doors including a pair of front side doors 20A and a pair of rear side doors 20B, on opposite lateral sides that allow ingress and egress to the motor vehicle 10. The body 12 also includes a roof 14 on the top side and a windshield 16 at the front end of the passenger compartment 24 that generally extend between left and right side front support pillars 18A. The motor vehicle 10 also has middle support pillars 18B that separate the first and rear side doors 20A and 20B on opposite lateral sides and rear support pillars 18C on opposite lateral sides generally rearward or adjacent to the rear row of seating.

The motor vehicle 10 is shown equipped with an interior lighting system 30 that provides ambient interior lighting in the passenger compartment 24 within separate and distinct lighting sections or zones 132A-132E. The interior lighting system 30 includes a plurality of lighting devices 32 which may include light sources such as light emitting diodes (LEDs) and light pipes, according to one example. One or more of a grouping of lighting devices 32 may define each separate and distinct lighting zone 132A-132E. In the example shown, the motor vehicle 10 has five separate lighting zones 132A-132E each one being associated with a designated one of the seats 26A-26E. Each of the lighting zones 132A-32E generally extend proximate to the corresponding seat at an elevation within an upper region proximate to the underside of the roof 14 and the front, middle, and rear support pillars 18A, 18B, and 18C.

In the example shown, the interior lighting system 30 has a first lighting zone 132A that provides ambient interior lighting in the passenger compartment 24 proximate to the driver first seat 26A. The first lighting zone 132A includes a first lighting device 32A shown generally extending along the left side front support pillar 18A, a second lighting device 32B shown generally extending along the underside of the roof, such as in a headliner, in front of the driver first seat 26B, and a third lighting device 32C shown generally extending along the underside of the roof along the left side between the front left support pillar 18A and the rear left support pillar 18B. The first, second and third lighting devices 32A, 32B and 32C may include one or more light-emitting diodes (LEDs) and light pipes, for example. The first, second and third lighting devices 32A, 32B and 32C may be controlled by a user to provide a user selectable lighting color and intensity (brightness) in the first lighting zone 132A.

The lighting zones also include a second lighting zone 132B that provides ambient interior lighting in the passenger compartment 24 proximate to the passenger second seat 26B. The second lighting zone 132B includes a fourth lighting device 32D shown generally extending along the right side front support pillar 18A, a fifth lighting device 32E extending along the underside of the roof, such as in the headliner, in front of the passenger second seat 26B, and a sixth lighting device 32F generally extending along the underside of the roof along the right side between the front right side support pillar 18A and the rear right side support pillar 18B. The fourth, fifth and sixth lighting devices 32D, 32E and 32F may include one or more light-emitting diodes (LEDs) and light pipes, for example. The fourth, fifth and sixth lighting devices 32D, 32E and 32F may be controlled by a user to provide a user-selectable lighting color and intensity in the second lighting zone 132A.

The lighting zones also includes a third lighting zone 132C that provides ambient interior lighting in the passenger compartment 24 proximate to the third seat 26C in the second row of seating. The third lighting zone 132C includes a seventh lighting device 32G shown generally extending along the left side middle support pillar 18B, an eighth lighting device 32H extending along the underside of the roof, such as in the headliner, along the left side between the middle left side support pillar 18B and the rear left side support pillar 18C, and a ninth lighting device 32I extending along the underside of the roof, such as in the headliner, above the third seat 26C. The seventh, eighth and ninth lighting devices 32G, 32H and 32I may include one or more light-emitting diodes (LEDs) and light pipes, for example. The seventh, eighth and ninth lighting devices 32G, 32H and 32I may be controlled by a user to provide a user-selectable lighting color and intensity in the third lighting zone 132A.

The lighting zones further include a fourth lighting zone 132D that provides ambient interior lighting in the passenger compartment 24 proximate to the fourth seat 26D in the second row of seating. The fourth lighting zone 132D includes a tenth lighting device 32J shown generally extending along the underside of the roof, such as in the headliner, above the fourth seat 26D. The tenth lighting device 32J may include one or more light-emitting diodes (LEDs) and light pipes, for example. The tenth lighting device 32J may be controlled by a user to provide user-selectable lighting color and intensity in the fourth lighting zone 132D.

The lighting zones further include a fifth lighting zone 132E that provides ambient interior lighting in the passenger compartment 24 proximate to the fifth seat 26E in the second row of seating. The fifth lighting zone 132E includes an eleventh lighting device 32K shown generally extending along the right side middle support pillar 18B, a twelfth lighting device 32L extending along the underside of the roof, such as in the headliner, along the right side between the middle right side support pillar 18B and the rear right side support pillar 18C, and a thirteenth lighting device 32M extending along the underside of the roof, such as the headliner, above the fifth seat 26E. The eleventh, twelfth and thirteenth lighting devices 32K, 32L and 32M may include one or more light-emitting diodes (LEDs) and light pipes, for example. The eleventh, twelfth and thirteenth lighting devices 32K, 32L and 32M may be controlled by a user to provide a user-selectable lighting color and intensity in the fifth lighting zone 132E.

It should be appreciated that the lighting devices 32 may be disposed or assembled within a headliner on the underside of the roof of the vehicle or within a trim panel associated with a corresponding support pillar, roof or headliner, for example. One example of a lighting device 32 is shown in FIG. 2 having a light source, such as one or more LEDs 204 operatively coupled to a light pipe 202. The light pipe 202 is shown disposed and retained within an opening in a trim panel 200 having an open bottom side for emitting light illumination from the light pipe 202. The trim panel 200 may be a separate trim piece or a part of the headliner or support pillar, for example. The one or more LEDs 204 may include red-green-blue (RGB) LEDs which are controllable to select the desired color of light illumination and intensity of light illumination. This may generally be achieved by controlling the proportion of the red, green and blue light emitted along with the intensity of each LED being controlled typically by Pulse Width Modulation (PWM). The one or more LEDs 204 may be located at a terminal end of a light pipe 202 or at another location to inject the light into the light pipe 202. The light pipe 202 may include a high loss optical material that transmits and distributes the light along the length of the light pipe 202 and emits ambient lighting, according to one example.

It should be appreciated that the motor vehicle 10 is configured with a lighting system that allows for user control of the various lighting zones to select which lighting zones to illuminate, the intensity of the illumination, and the color of the illumination by using user controls. The user controls may include using a remote electronic device such as a phone having an application software, according to one example. According to another example, the control of the lighting system may be implemented with user inputs available on the motor vehicle 10, such as a touch screen display and various telematic controls. By providing inputs through the user input device, the one or more lighting zones of ambient lighting in the upper portions of the passenger compartment 24 of the motor vehicle 10 may be selected for each lighting zone, and the intensity and color of the light illumination may be adjusted.

Figure 4:
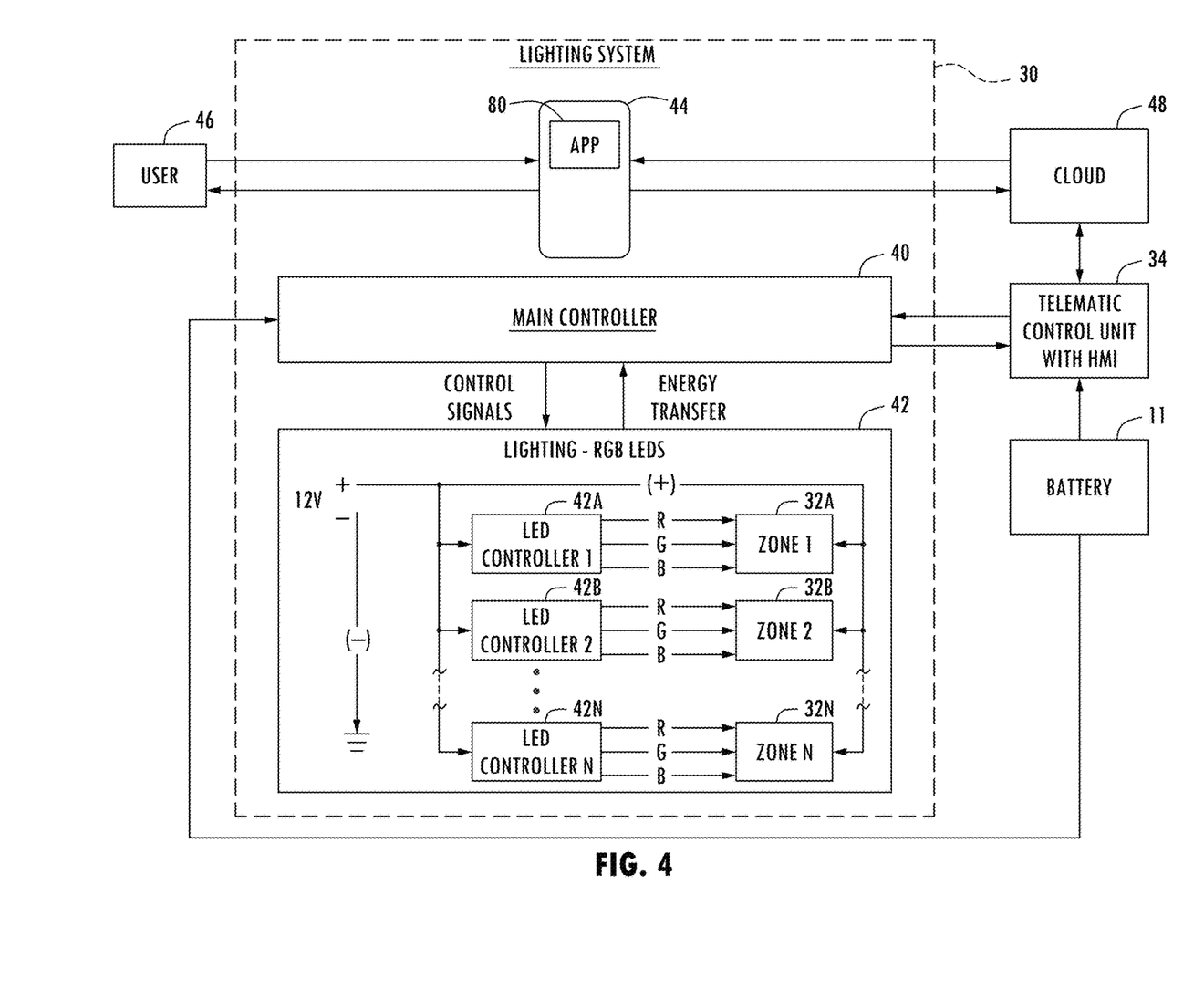
FIG. 4 is a block diagram illustrating the lighting system having various user inputs and controls for controlling the lighting zones within the passenger compartment of the vehicle.
Figure 5:
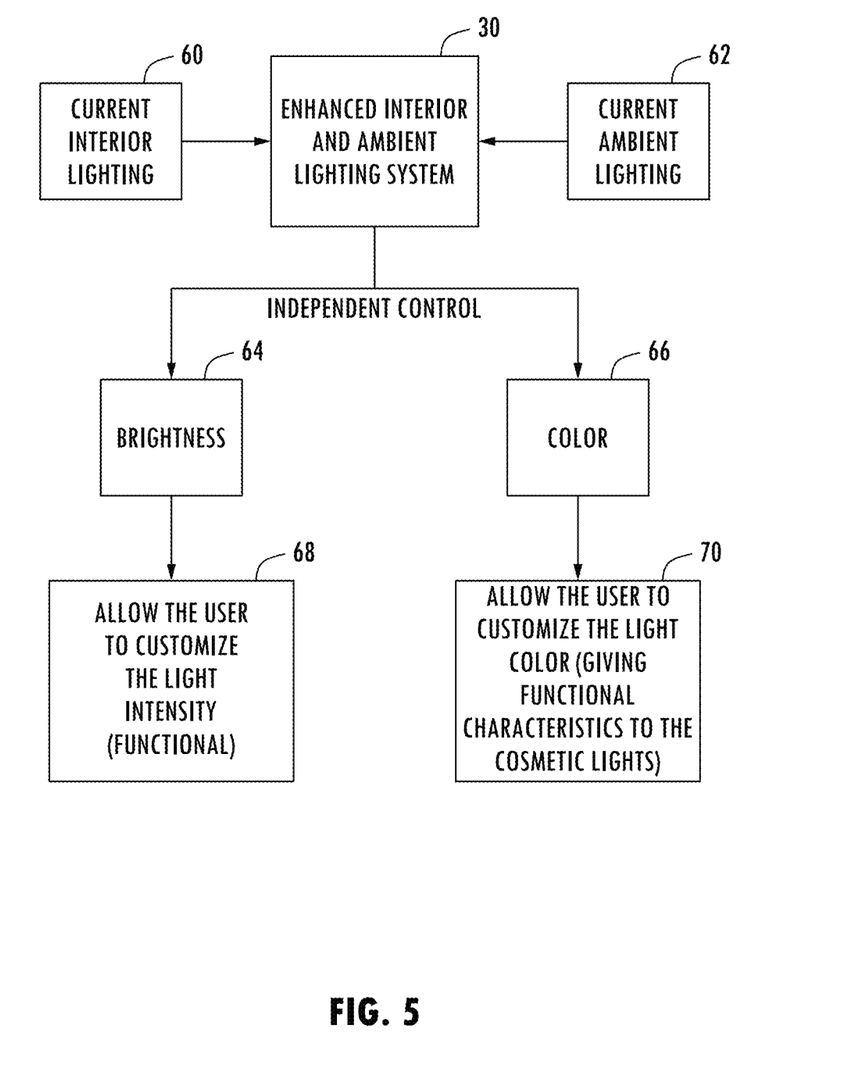
FIG. 5 is a block diagram further illustrating the interior lighting system and the user remote controls therefore.

Referring to FIG. 4, the lighting system 30 is generally illustrated having various controllers and a remote user input in the form of a portable electronic device 44, such as a phone. The portable electronic device 44 may interact with a user 46 and may include application software 80 in the form of an application (app) configured to selectively control the lighting zones. The application software 80 may interface with a distributed collection of servers accessible over the Internet, which may be referred to as the cloud 48. A telematic control unit with a human machine interface 34 may likewise communicate with the cloud 48 and may receive power from a battery, such as the vehicle battery 11. The vehicle battery 11 may also supply electrical power to power the lighting devices 32 through the lighting RGB LEDs 42. The lighting RGB LEDs 42 may include a plurality of LED controllers 42A-42N configured to control N number of lighting zones labeled Section 1 (32A) through Section N (32N). Each of the LED controllers 42A-42N may control the red, green and blue LEDs distributing light to each of the lighting zones 32A-32N which may include the control of the color and brightness or intensity of the light. The lighting RGB LEDs 42 may further be controlled by a main controller 40 which provides control signals for controlling lighting in each of the lighting zones 32A-32N. Energy delivered from the vehicle battery 11 to the lighting RGB LEDs 42 may in turn be also transferred to the main controller 40. The light emitted within each of the lighting zones 32A-32N is then distributed to the motor vehicle 10. The interior ambient lighting system 30 is illustrated in FIG. 5 incorporating the current interior lighting 60 and the current ambient lighting 62. The lighting system 30 provides independent control of the brightness 64 and color 66 for each of the selected zones of lighting. The brightness or intensity may be adjusted by a user to allow the user to customize the light intensity at block 68. Similarly, the color of the light may be adjusted by a user and thereby customized by the user in block 70.

Figure 6:
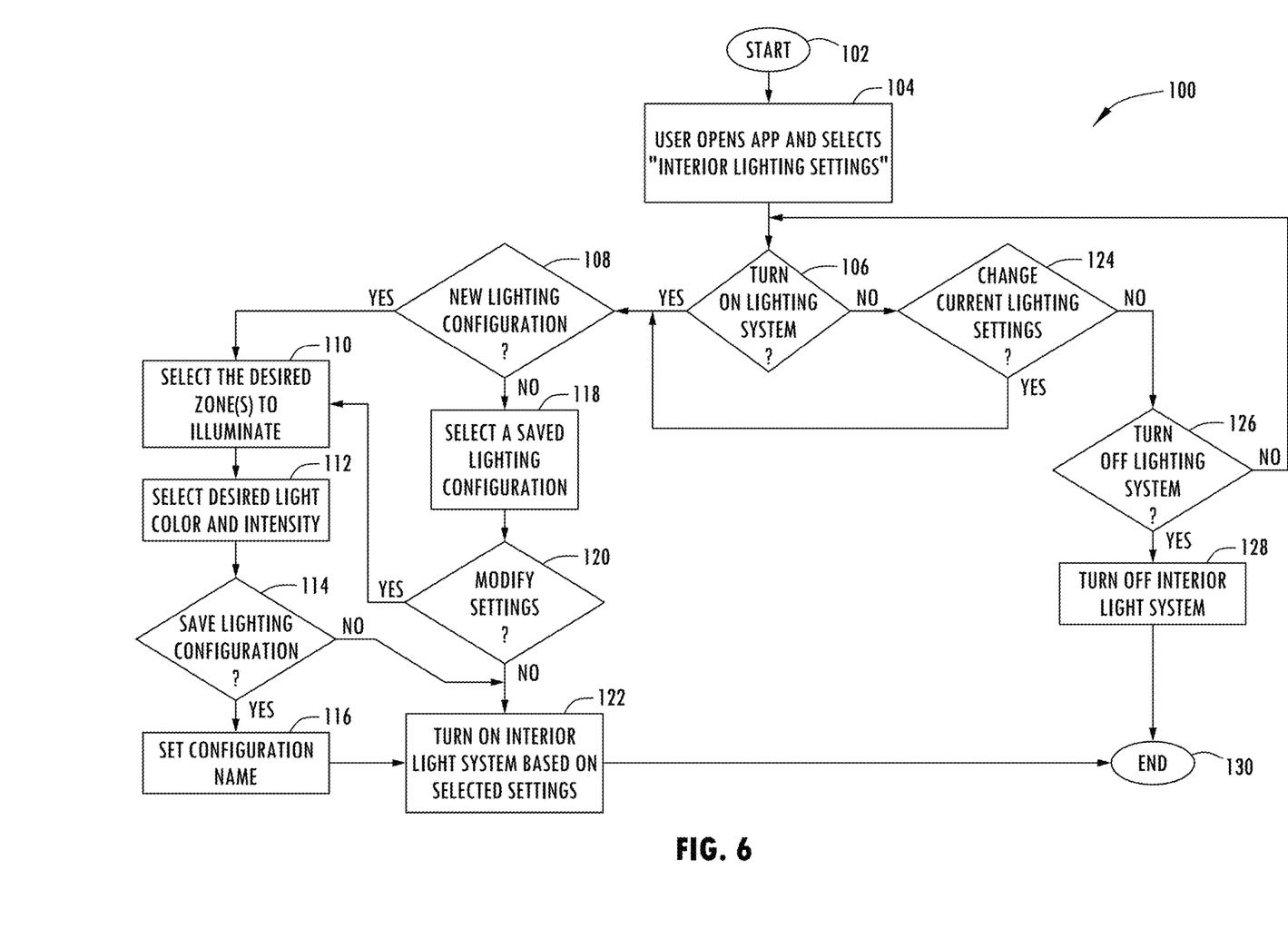
FIG. 6 is a flow diagram illustrating a method of controlling the interior lighting system, according to one embodiment.

Referring to FIG. 6, a routine for controlling the interior lighting system is shown, according to one example. Routine 100 begins at step 102 and proceeds to step 104 where a user opens an app on their portable electronic device and selects "Interior Lighting Settings". Next, at decision step 106, routine 100 determines if the lighting system is turned on. If the lighting system is turned on, routine 100 proceeds the decision step 108 to determine if a new lighting configuration is requested. If a new lighting configuration has been requested, routine 100 proceeds to step 110 to select the desired lighting zone or zones to illuminate, and then to step 112 to select the desired light color and intensity. Next, at decision step 114, routine 100 determines if the lighting configuration is to be saved in memory and, if so, sets the configuration with a given name at step 116, and then proceeds to step 122 to turn on the interior light system based on the selected settings, before ending at step 130. If the lighting configuration is not to be saved, routine 200 proceeds directly to turn on the interior light system based on the selected settings, before ending at step 130.

If there is no new lighting configuration determined at step 108, routine 200 proceeds to step 110 to select a saved lighting configuration and then proceeds to decision step 120 to determine if the settings are to be modified. If the settings are to be modified, routine 200 proceeds to step 110 to select the desired lighting zone or zones to illuminate. If there are no settings to modify, routine 200 proceeds to step 122 to turn on the interior light system based on the selected settings, before ending at step 130.

If the lighting system is determined not to be turned on at decision step 106, routine 100 proceeds to decision step 124 to determine if there is a change to the current lighting settings requested and, if so, proceeds to decision step 108. If there is no change to the current lighting settings request, routine 200 proceeds to decision step 126 to determine if the lighting system is to be turned off and, if not, returns to step 106. If the lighting system is determined to be requested to turn off, routine 200 proceeds to step 128 to turn off the interior light system before ending at step 130.

Figure 7:
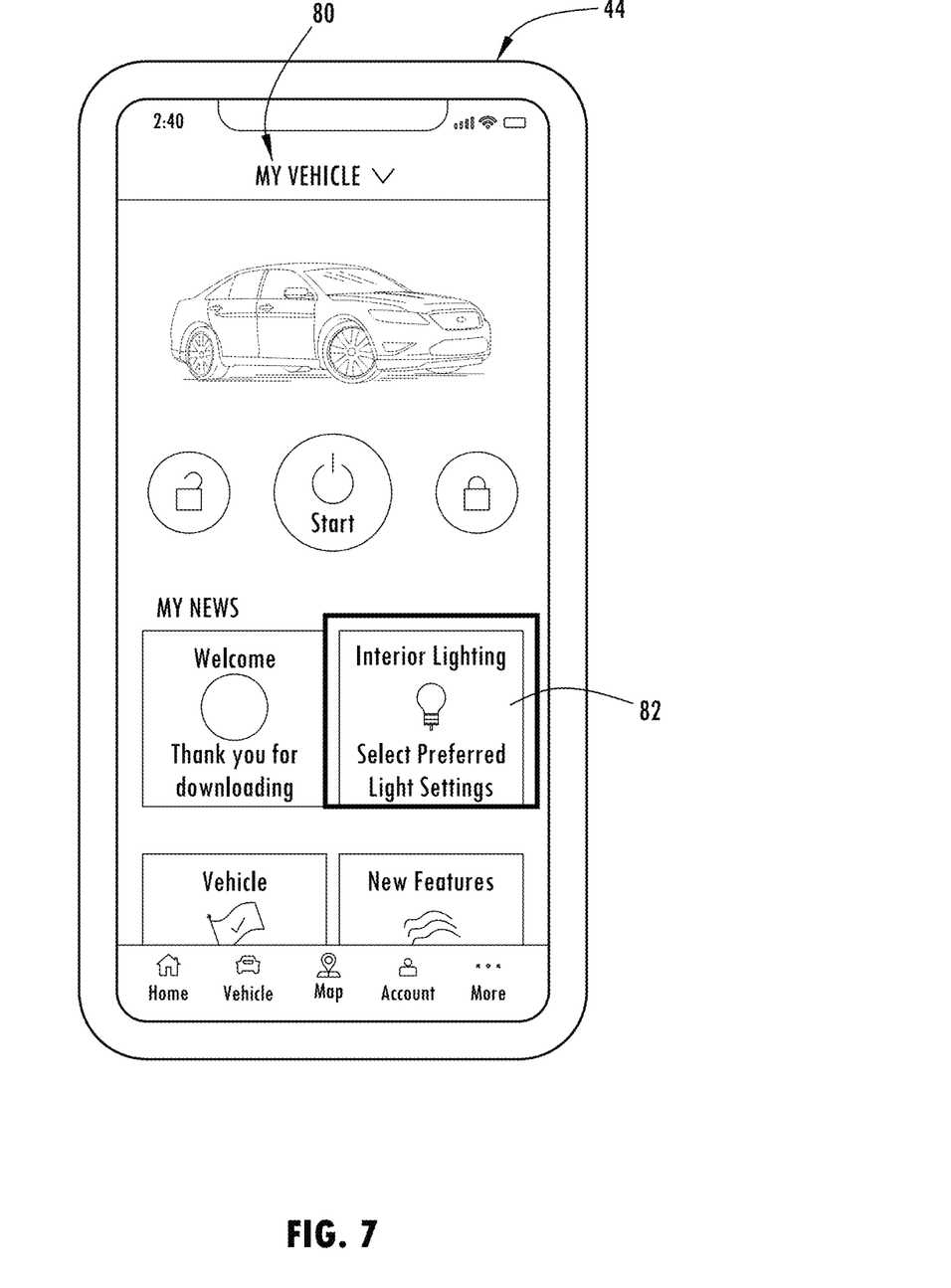
FIG. 7 is a schematic view of a portable electronic phone having an app for controlling the interior lighting system shown in one mode.
Figure 8:
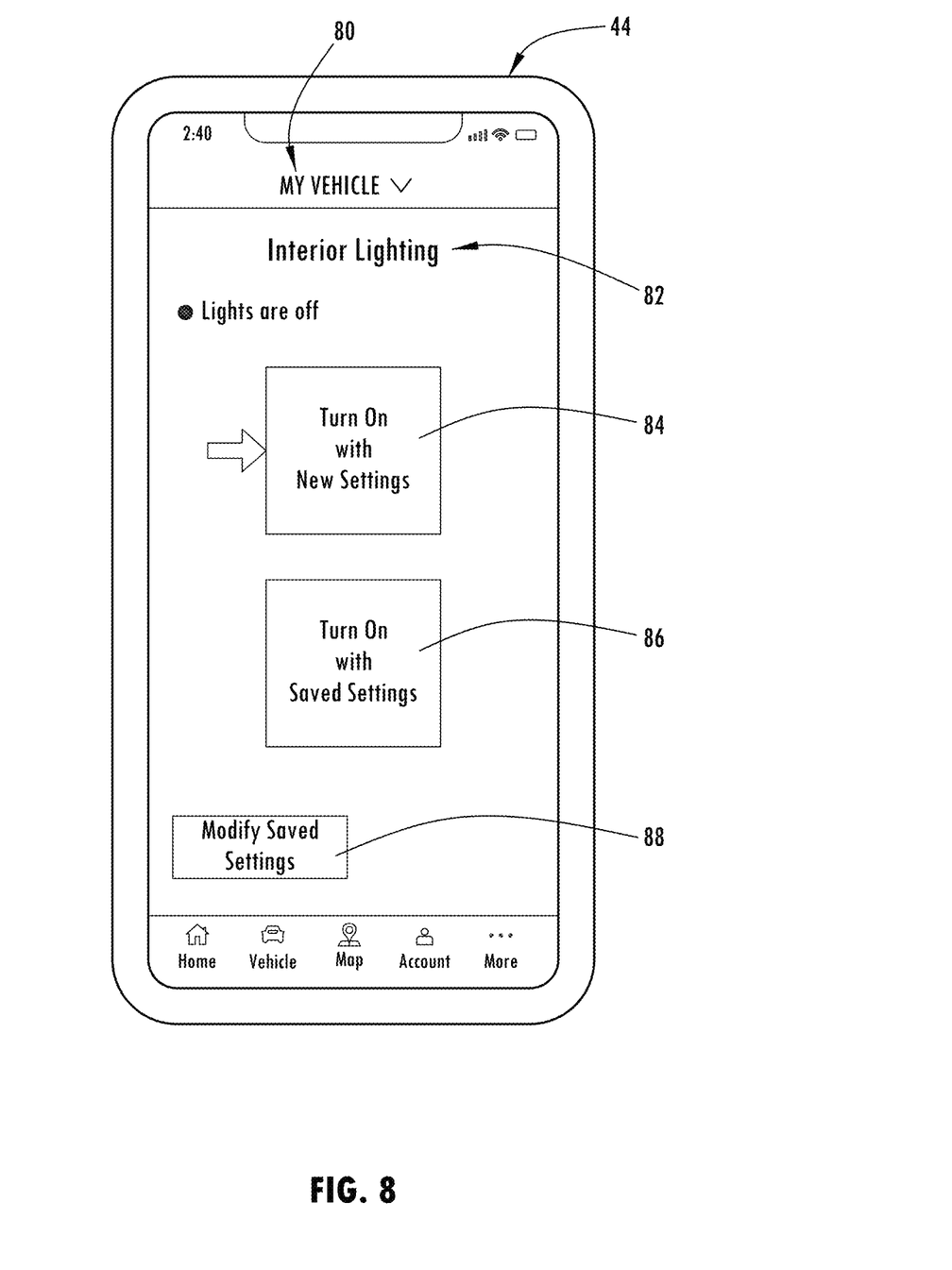
FIG. 8 is a schematic view of a portable electronic phone having an app for controlling the interior lighting system shown in a further mode.

The interior lighting system may be remotely controlled with user input selections on a remote device, such as a phone, a tablet, a key fob, a computer, or other portable electronic device, as well as the vehicle touch screen display 34. One example of a portable electronic device 44 in the form of a phone is shown in FIGS. 7-11 for controlling the vehicle interior lighting system to control each of one or more of the selectable lighting zones to turn one or more zones on or off, to control the color of each zone, and to control the intensity of each zone. The vehicle interior lighting app 80 may be downloaded and stored on the portable electronic device 44 and used to control the vehicle interior lighting. As seen in FIG. 7, an icon 82 is shown on a display on the remote portable electronic device 44 and is designated to control the interior lighting to select the preferred light settings for a particular vehicle. Once the interior lighting icon is selected by a user, the application on the phone provides user-selectable inputs to turn on with new settings at input 84, to turn on with save settings at input 86, and to modify saved settings at input 88. A user may simply select one of the inputs 84, 86 or 88 to achieve the desired lighting settings.

Figure 9:
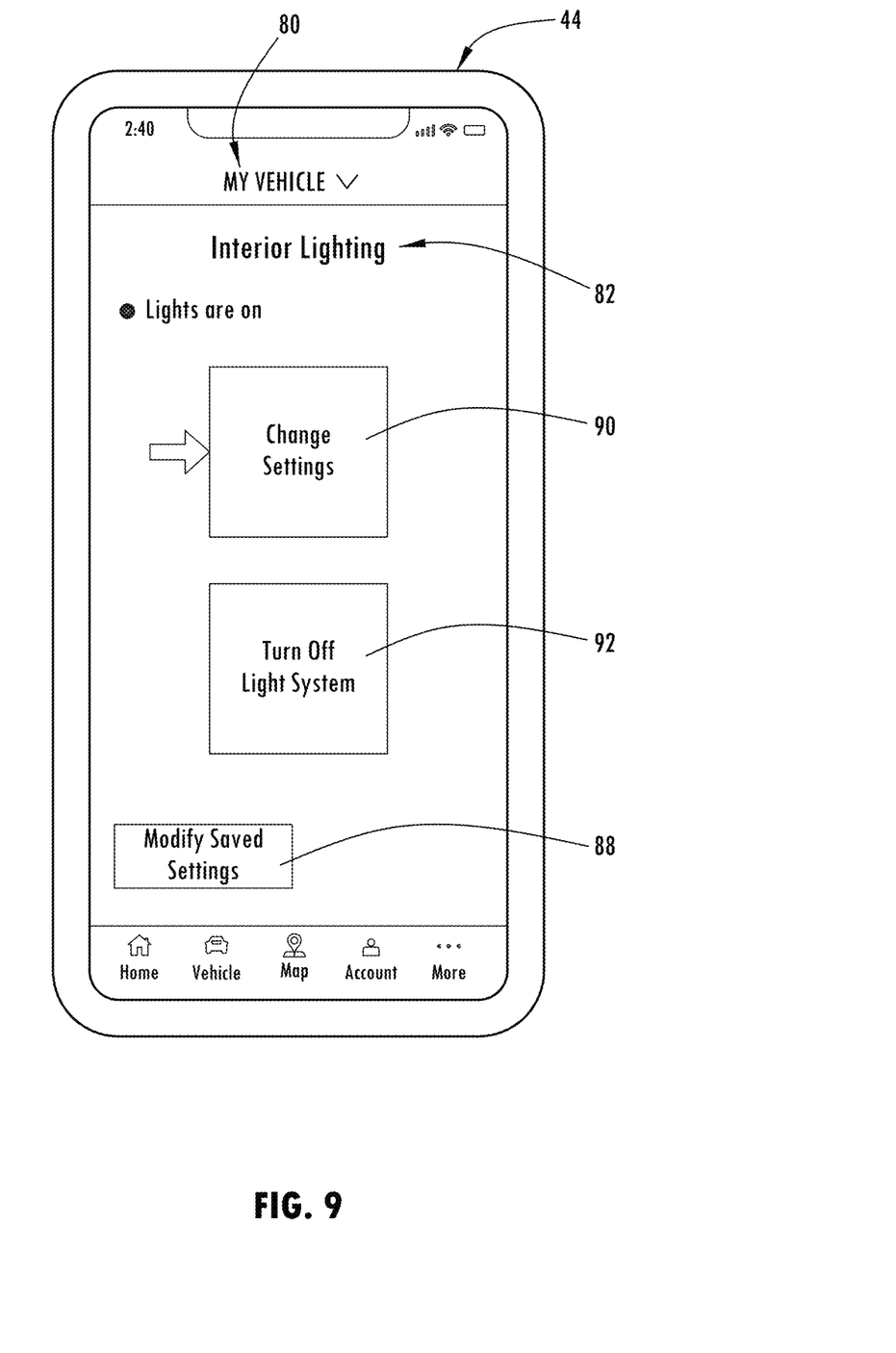
FIG. 9 is a schematic view of a portable electronic phone having an app for controlling the interior lighting system shown in a further mode.
Figure 10:
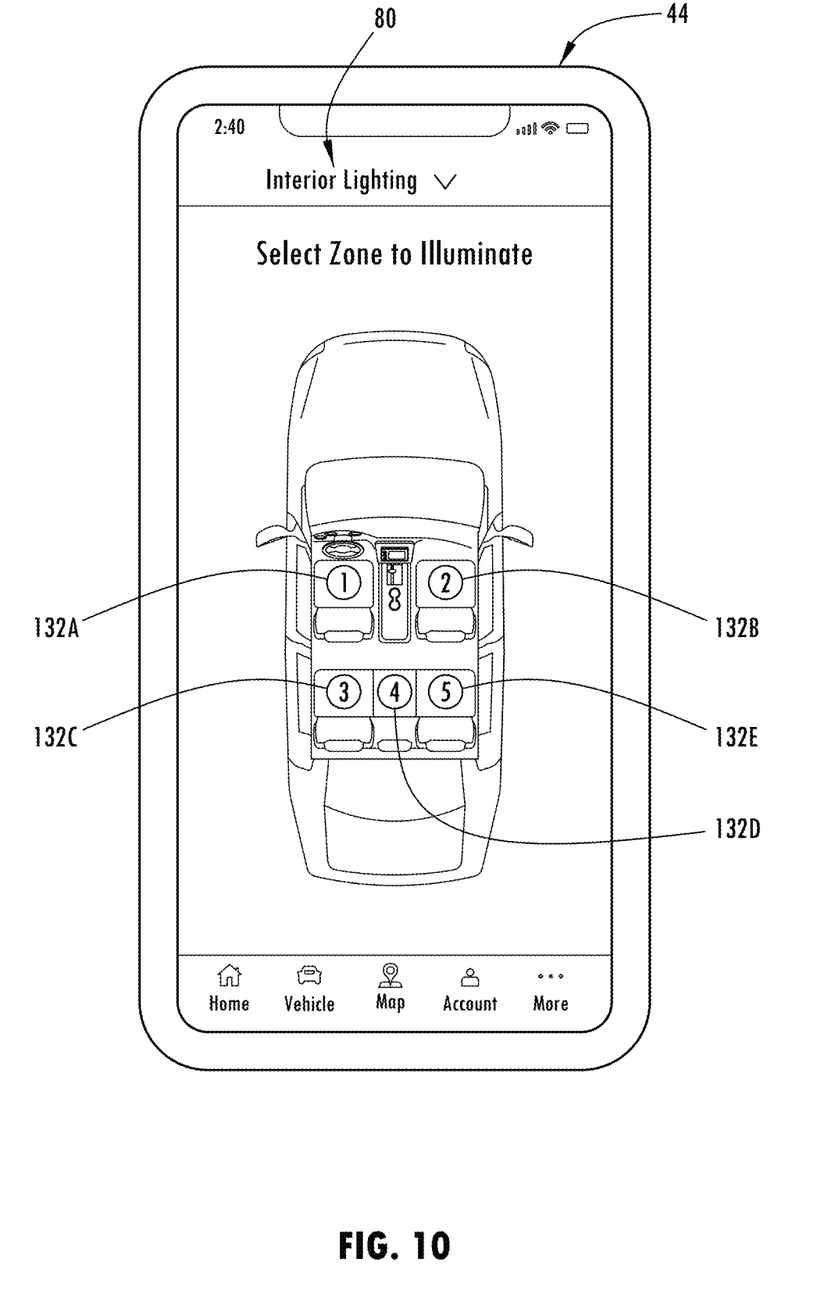
FIG. 10 is a schematic view of a portable electronic phone having an app for selecting the zone for the interior lighting system.
Figure 11:
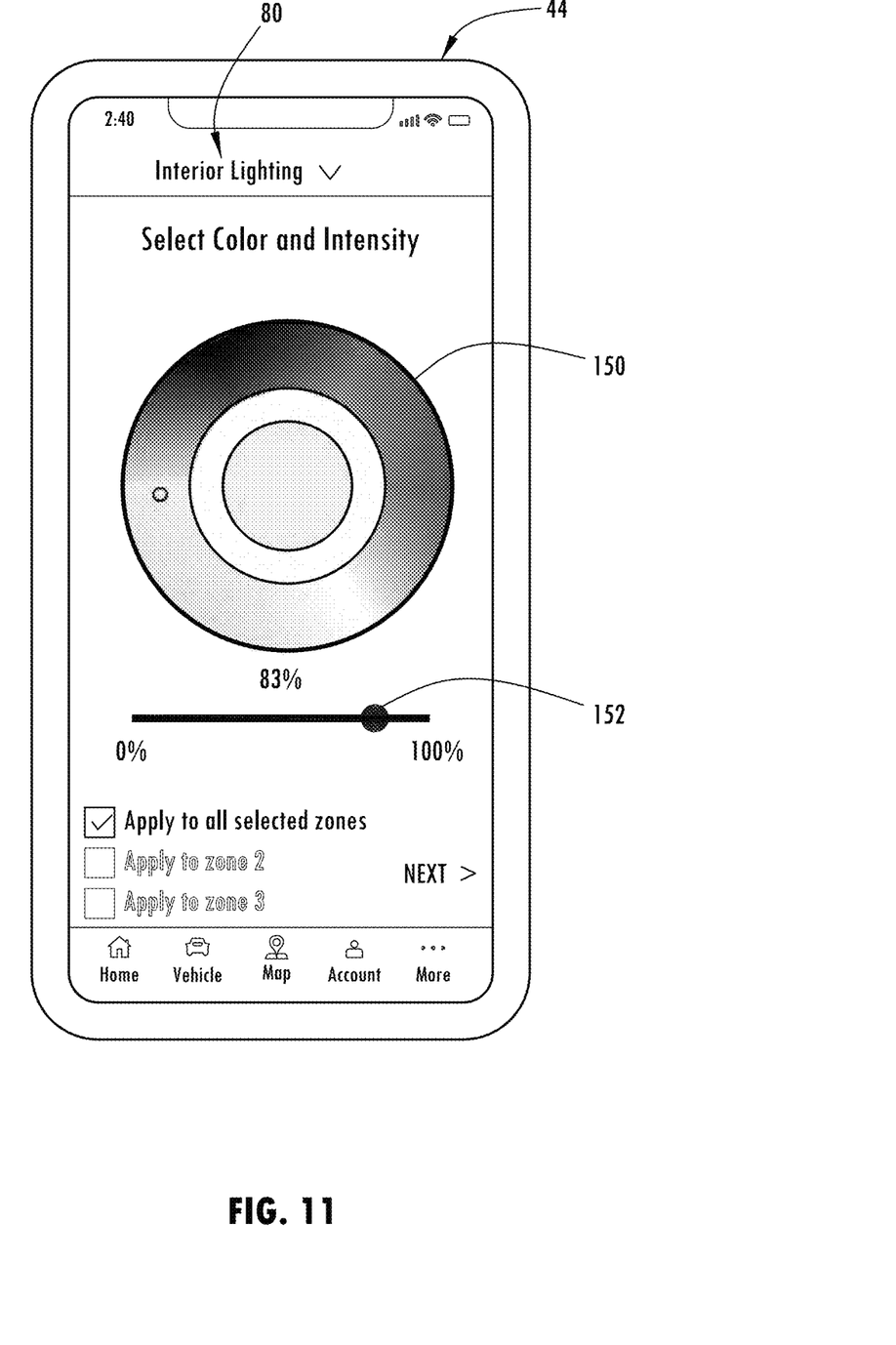
FIG. 11 is a schematic view of a portable electronic phone having an app for controlling color and intensity of the selected light zones.

As seen in FIG. 9, the phone app associated with the application software 80 may provide a change settings input 90, a turn off light system input 92, and a modify save settings input 88. The phone app may further include a zone selection input as seen in FIG. 10. The zone selection input includes designating each of the user selectable lighting zones 132A-132E with an input to select which zone to control. A user may activate one of the lighting zones 132A-132E to select a zone to control. Next, the phone app may illustrate a light color and light intensity selection as seen in FIG. 11. The color selection input 150 allows the user to select a desired color for the selected zone. A brightness selection input 152 allows the user to select the desired intensity or brightness of lighting for the selected zone. Accordingly, remote control of a selected lighting zone including the brightness and color may be remotely controlled by a user. It should be appreciated that other types of device and phone applications and inputs may be provided to allow a user to control a selectable lighting zone with the desired color and light intensity.

Accordingly, the interior lighting system advantageously provides for an enhanced lighting system to provide ambient interior lighting in the motor vehicle 10. The enhanced lighting system provides for elevated lighting in upper regions proximate to a vehicle seat close to an underlying portion of the roof or upper support pillars in the passenger compartment of the motor vehicle 10. A user may utilize a user input such as a portable electronic device or the vehicle touch screen display 34 to select a lighting zone or zones designated to their seating position on a seat within the motor vehicle 10 and may remotely control the intensity and color of the light illumination within that zone or zones proximate to that seat.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a body defining a passenger compartment, the body comprising a roof and a plurality of support pillars extending proximate to the roof;
a plurality of seats including a first seat and a second seat;
a plurality of predefined lighting zones comprising a plurality of lighting devices located in an upper portion of the body proximate to the roof and the plurality of support pillars, the plurality of predefined lighting zones including a first lighting zone associated with the first seat and a second lighting zone associated with the second seat, wherein the first lighting zone includes a first lighting device extending alone a first front support pillar, a second lighting device extending under the roof in front of the first seat, and a third lighting device extending under the roof on a lateral side of the first seat, and wherein the second lighting tone includes a fourth lighting device extending along a second front support pillar, a fifth lighting device extending under the roof in front of the second seat, and a sixth lighting device extending under the roof on a lateral side of the second seat;
a user input configured to allow for the selection of one of the plurality of predefined lighting zones, a color of light output and an intensity of the light output; and
a controller responsive to the user input to control the selected one of the plurality of predefined lighting zones to illuminate light in a selected lighting zone at the selected intensity and color with the selected intensity and color.

2. The vehicle of claim 1, wherein the plurality of lighting devices extend along portions of the roof and the plurality of support pillars.

3. The vehicle of claim 2, wherein the plurality of lighting devices are segmented to allow for independent control in different lighting zones of the vehicle.

4. The vehicle of claim 3, wherein the controller selects one of a plurality of predefined modes of lighting zones.

5. The vehicle of claim 1, wherein the first seat comprises a driver seat and the second seat comprises a passenger seat.

6. The vehicle of claim 1, wherein the user input comprises at least one of a portable electronic device and a vehicle touch screen display.

7. The vehicle of claim 1, wherein the plurality of lighting zones are located in upper regions of the passenger compartment.

8. A method of controlling interior lighting in a vehicle, the method comprising the steps of:
selecting one of a plurality of predefined lighting zones configured in a passenger compartment of a vehicle with a user input, wherein the plurality of predefined lighting zones includes a first lighting zone associated with a first seat and a second lighting zone associated with a second seat;
controlling a color of the selected one of the plurality of predefined lighting zones with the user input; and
controlling an intensity of the selected one of the plurality of predefined lighting zones with the user input, wherein the plurality of predefined lighting zones comprises a first lighting device extending along a first front support pillar, a second lighting device extending under the roof in front of the first seat, and a third lighting device extending under the roof on a lateral side of the first seat, and wherein the second lighting zone includes a fourth lighting device extending along a second front support pillar, a fifth lighting device extending under the roof in front of the second seat, and a sixth lighting device extending under the roof on a lateral side of the second seat.

9. The method of claim 8, wherein the one or more lighting devices extend along portions of the roof and upper support pillars.

10. The method of claim 9, wherein the plurality of predefined lighting zones are segmented to allow for independent control in different lighting zones of the vehicle.

11. The method of claim 10, further comprising selecting one of a plurality of predefined modes of lighting zones.

12. The method of claim 8, wherein the first seat comprises a driver seat and the second seat comprises a passenger seat.

13. The method of claim 8, wherein each lighting zone comprises one or more light pipes.

14. The method of claim 8, wherein the plurality of lighting zones are located in upper regions of the passenger compartment.

* * * * *

UNITED STATES PATENT AND TRADEMARK OFFICE
CERTIFICATE OF CORRECTION

Page 1 of 1

PATENT NO. : 12,128,820 B1
APPLICATION NO. : 18/609718
DATED : October 29, 2024
INVENTOR(S) : Mora Ortiz et al.

It is certified that error appears in the above-identified patent and that said Letters Patent is hereby corrected as shown below:

In the Claims

Column 9:
Claim 1, Line 24;
"tone" should be --zone--.

Signed and Sealed this
Thirty-first Day of December, 2024

Derrick Brent
*Acting Director of the United States Patent and Trademark Office*